United States Patent
Jeter, Jr.

(10) Patent No.: US 7,155,588 B1
(45) Date of Patent: Dec. 26, 2006

(54) MEMORY FENCE WITH BACKGROUND LOCK RELEASE

(75) Inventor: Robert E. Jeter, Jr., Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 216 days.

(21) Appl. No.: 10/217,023

(22) Filed: Aug. 12, 2002

(51) Int. Cl.
*G06F 12/00* (2006.01)

(52) U.S. Cl. .................... 711/163; 711/151; 711/152

(58) Field of Classification Search ........ 711/150–154, 711/163–168; 709/210, 216; 209/153; 710/48, 710/52, 200, 241
See application file for complete search history.

(56) References Cited

U.S. PATENT DOCUMENTS

| | | | | |
|---|---|---|---|---|
| 5,276,847 A | * | 1/1994 | Kohn | 711/163 |
| 5,341,491 A | * | 8/1994 | Ramanujan | 711/152 |
| 5,408,629 A | * | 4/1995 | Tsuchiva et al. | 711/151 |
| 5,678,026 A | * | 10/1997 | Vartti et al. | 711/152 |
| 5,860,159 A | * | 1/1999 | Hagersten | 711/151 |
| 6,026,464 A | | 2/2000 | Cohen | |
| 6,052,763 A | * | 4/2000 | Maruyama | 711/152 |
| 6,119,215 A | | 9/2000 | Key et al. | |
| 6,195,739 B1 | | 2/2001 | Wright et al. | |
| 6,230,241 B1 | | 5/2001 | McKenney | |
| 6,330,645 B1 | | 12/2001 | Harriman | |
| 6,338,108 B1 | * | 1/2002 | Motomura | 710/110 |
| 6,473,849 B1 | * | 10/2002 | Keller et al. | 712/30 |
| 2002/0073282 A1 | * | 6/2002 | Chauvel et al. | 711/122 |

* cited by examiner

*Primary Examiner*—Brian R. Peugh
(74) *Attorney, Agent, or Firm*—Cesari and McKenna LLP

(57) ABSTRACT

A technique releases locks associated with particular memory locations. The technique uses a "background" approach to determining when the locks should be released in that memory operations associated with the memory locations are monitored while instructions continue to execute on a processor. The memory operations are monitored by generating a condition for each memory operation and clearing the condition when the operation completes. When all the conditions are cleared, the associated locks are released.

30 Claims, 12 Drawing Sheets

```
104 - GETLOCK          // ACQUIRE LOCK
106 - READ A           // READ DATA FROM LOCATION A
108 - WRITE A          // WRITE DATA TO LOCATION A
110 - READ B           // READ DATA FROM LOCATION B
112 - WRITE B          // WRITE DATA TO LOCATION B
114 - RELEASELOCK      // RELEASE LOCK
116 - WRITE C          // WRITE DATA TO LOCATION C
   ⋮
```

| INSTRUCTION | COMMENTS | REQ ID |
|---|---|---|
| 704 — GETLOCK X | // ACQUIRE LOCK X | |
| 706 — READ A | // READ DATA FROM LOCATION A | 0 |
| 708 — WRITE A | // WRITE DATA TO LOCATION A | 1 |
| 710 — READ D | // READ DATA FROM LOCATION D | 2 |
| 712 — WRITE D | // WRITE DATA TO LOCATION D | 3 |
| 714 — MEMFENCE X A,D | // RELEASE LOCK X WHEN A,D COMPLETE | |
| 716 — WRITE C | // WRITE DATA TO LOCATION C | 4 |
| 718 — WRITE B | // WRITE DATA TO LOCATION B | 5 |

FIG. 7

MEMORY FENCE WITH BACKGROUND LOCK RELEASE

BACKGROUND OF THE INVENTION

1. Field of the Invention

The present invention relates to computer systems and specifically to the releasing of locking mechanisms associated with computer systems.

2. Background Information

Computer architecture generally defines the functional operation, including the flow of information and control, among individual hardware units of a computer. One such hardware unit is the processor or processing engine, which contains arithmetic and logic processing circuits organized as a set of data paths. In some implementations, the data path circuits may be configured as a central processing unit (CPU) having operations that are defined by a set of instructions. The instructions are typically stored in an instruction memory and specify a set of hardware functions that are available on the CPU.

A high-performance computer may be realized by using a number of identical CPUs or processors to perform certain tasks in parallel. For a purely parallel multiprocessor architecture, each processor may have shared or private access to data, such as program instructions (e.g., algorithms), stored in a memory coupled to the processors. Access to an external memory is generally handled by a memory controller, which accepts memory requests from the various processors and processes them in an order that often is controlled by arbitration logic contained in the memory controller. Moreover, certain complex multiprocessor systems may employ many memory controllers where each controller is attached to a separate external memory subsystem.

One place where a parallel, multiprocessor architecture can be advantageously employed involves the area of data communications and, in particular, the processing engine for an intermediate network station or node. The intermediate node interconnects communication links and subnetworks of a computer network to enable the exchange of data between two or more software entities executing on hardware platforms, such as end nodes. The nodes typically communicate by exchanging discrete packets or frames of data according to predefined protocols, such as the Transmission Control Protocol/Internet Protocol (TCP/IP) or the Internetwork Packet Exchange (IPX) protocol.

When two processors in a multiprocessor system vie for access to a single shared memory resource a lock is employed that allows for orderly access to the shared resource. In this context, the lock is an abstraction representing permission to access the resource. For example, the lock may be configured to ensure that only one processor accesses a segment of the memory at any given time. Here, each segment of the memory may have a lock (e.g., a memory bit) associated with it and whenever a processor requires access to the segment, it determines whether the lock is "locked" or "unlocked." A locked status indicates that another processor is currently accessing that segment of the memory. Conversely, an unlocked status indicates that the segment is available for access. Thus, when a processor attempts to access a memory segment, it simply tests the lock associated with the segment to determine whether that segment is currently being accessed. If not, the testing processor acquires the lock to exclude other processes from accessing the segment.

A typical sequence of instructions involving a lock is illustrated in FIG. 1. At line 104 a processor acquires a lock associated with memory locations "A" and "B." It then performs a series of operations involving memory locations A and B, as indicated at lines 106 through 112, and releases, i.e., unlocks, the lock, as indicated at line 114.

Before a lock is released, a processor must ensure that all operations associated with the lock have completed. Thus, before the RELEASELOCK instruction at line 114 can release the lock, the instruction must ensure that all prior memory operations have completed. One previous technique that may be used to ensure such a result would be to serialize all the instructions, such that before an instruction can be executed, the previous instruction and all its associated memory operations must have completed. Thus, for example, before the "write" instruction at line 108 can be executed, the "read" instruction at line 106 and its associated memory operation, i.e., "read memory location A," must be completed.

One drawback associated with this instruction serialization technique is that it is inefficient since memory operations are not performed in parallel. For example, assume that the instructions at lines 108 and 110 access memory locations controlled by different memory controllers. By serializing instruction execution and memory operation, the total time involved performing both memory operations will be at least the time it takes to complete the memory operation on location A plus the time it takes to complete the memory operation on location B. This total time is greater than the time needed to perform the operations in parallel, e.g., the time it takes to complete the longer of the two operations.

Another previous technique that could be used to ensure that all memory operations have completed before releasing a lock is to modify the RELEASELOCK instruction such that instruction execution stalls until all the memory operations have completed before proceeding to the instruction after the RELEASELOCK instruction, e.g., the instruction at line 116. Although certain memory operations may be performed in parallel, this previous technique forces operations following the RELEASELOCK instruction to stall until all prior memory operations have completed before instruction execution proceeds. As a result, a measure of performance improvement due to parallelization is lost, waiting for these operations to complete before instruction execution can proceed.

SUMMARY OF THE INVENTION

The present invention relates to an improved technique for efficiently releasing one or more locks that are associated with one or more memory locations. The inventive technique establishes conditions where each condition is associated with a memory operation that specifies one of the memory locations. As each memory operation completes, the condition associated with the operation is cleared. When all the conditions are cleared, the locks are released.

Briefly, in the illustrative embodiment, a MEMFENCE instruction is provided that associates one or more locks with one or more memory locations. When a memory request is issued to a memory controller, a request identifier (ID) for the request is maintained in an entry in a last request table that is associated with the memory controller. For each successive memory request to the same memory controller, the entry is overwritten with the request ID of the successive request such that the entry contains the request ID of the last request sent to the controller.

When the MEMFENCE instruction is processed, conditions are generated using the last request table entries for the memory controllers associated with the memory locations specified in the MEMFENCE instruction. These conditions are placed in a condition data structure and the locks specified by the MEMFENCE instruction are associated with the data structure. As each memory request completes, a return-request identifier (ID) containing the request ID is returned by the memory controller. The return-request ID is then compared to the request IDs in the condition data structure and if a match is found, the condition is cleared. When all the conditions contained in the condition data structure are cleared, the locks associated with the data structure are released.

Advantageously, the inventive technique is an improvement over previous techniques in that it does not require serialization of instructions or polling of memory operations to ensure that all operations associated with a lock have completed before the lock is released. Rather, the inventive technique employs a "background" approach to releasing the locks. According to this approach, the memory operations are monitored and the locks released by, e.g., special hardware configured to further clear the locks when all of the operations complete. The novel technique enables instruction execution to continue without having to stall while waiting for the memory operations to complete.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 7 is a sequence of processor instructions involving locks that can be used with the present invention;

DETAILED DESCRIPTION OF AN ILLUSTRATIVE EMBODIMENT

Figure 1:
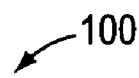
FIG. 1 is a sequence of processor instructions that involves the use of locks.
Figure 2:
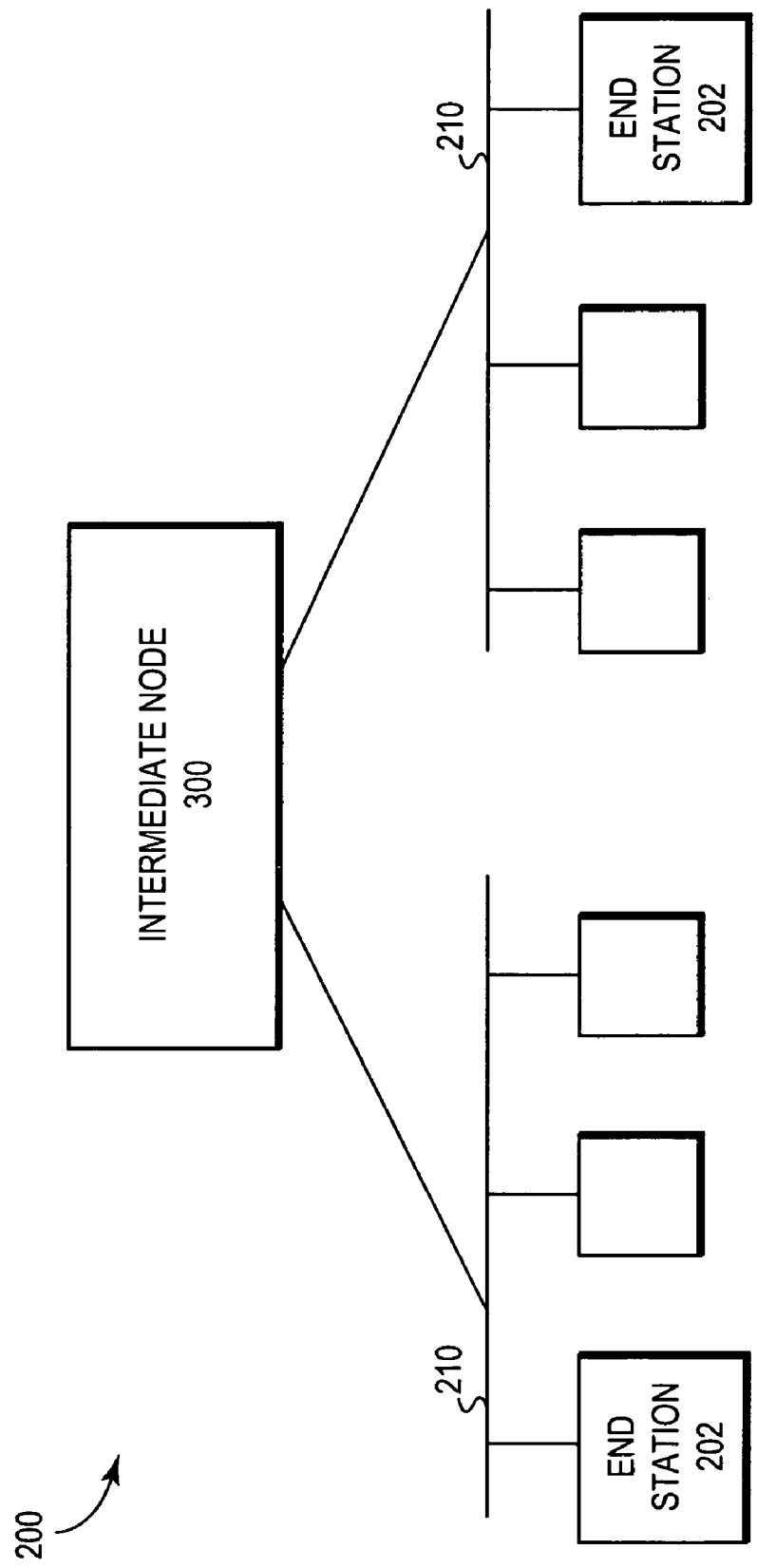
FIG. 2 is a block diagram of a computer network comprising a collection of interconnected communication media and subnetworks attached to a plurality of stations.

FIG. 2 is a block diagram of a computer network 200 comprising a collection of interconnected communication media and subnetworks attached to a plurality of nodes. The nodes are typically computers comprising end stations 202 and intermediate node 300. The intermediate node 300 may be a router or a network switch, whereas the end stations or nodes 202 may include personal computers or workstations. The subnetworks generally comprise local area networks (LANs) 210, although the invention may work advantageously with other communication media configurations such as point-to-point network links. Communication among the nodes of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internetwork Packet Exchange (IPX), AppleTalk or DECNet protocols.

Figure 3:
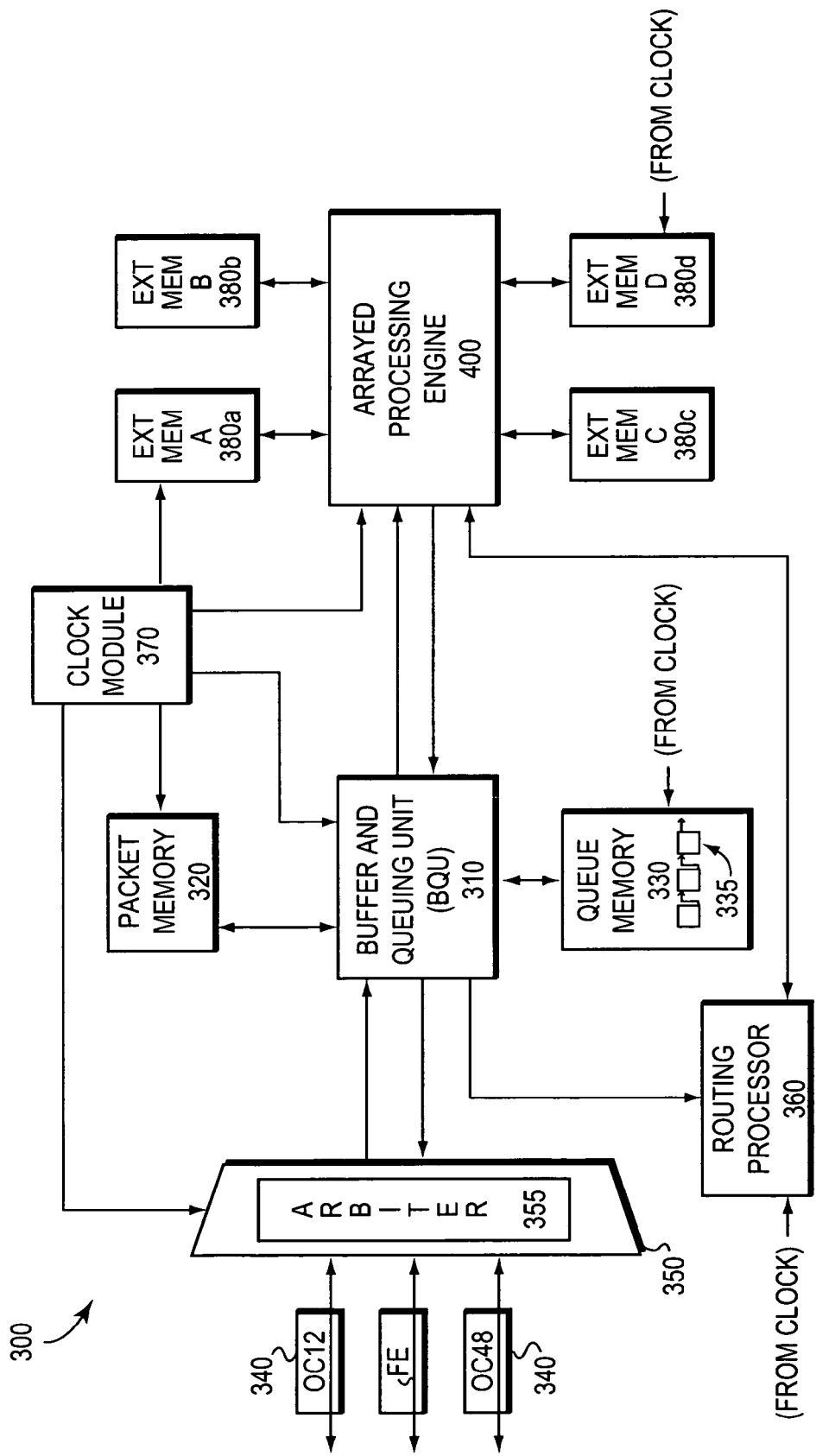
FIG. 3 is a schematic block diagram of an intermediate node, such as a network switch, having an arrayed processing engine coupled to a memory partitioned into a plurality of external memory resources that may advantageously implement the present invention.

FIG. 3 is a schematic block diagram of intermediate node 300 that, in the illustrative embodiment, is a network switch that can advantageously implement the present invention. The switch 300 generally performs layer 2 processing functions, such as "cut-through" operations wherein an entire frame does not have to be stored before transfer to a destination; in addition, switch 300 may implement layer 3 forwarding operations. It should be noted, however, that the switch 300 may also be configured as a router to perform layer 3 route processing. A feature of the architecture described herein is the ability to program the node for execution of layer 2, layer 3 or higher-layer operations. Operation of the switch will be described with respect to IP switching of packets, although the switch may be programmed for other applications, such as data encryption.

The switch 300 comprises a plurality of interconnected components including an arrayed processing engine 400, various memories, queuing logic 310 and network port interface cards 340. Operations of these components are preferably synchronously controlled by a clock module 370 although the arrayed elements of the processing engine may be operatively configured to function asynchronously. In the illustrative embodiment, the clock module 370 generates clock signals at a frequency of, e.g., 200 megahertz (i.e., 5 nanosecond clock cycles), and globally distributes them via clock lines to the components of the switch.

The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 400 is coupled to a memory partitioned into a plurality of external memory (Ext Mem) resources 380. A buffer and queuing unit (BQU) 310 is connected to a packet memory 320 for storing packets and a queue memory 330 for storing network layer headers of the packets on data structures, such as linked lists, organized as queues 335. The BQU 310 further comprises data interface circuitry for interconnecting the processing engine with a plurality of line cards 340 via a selector circuit 350 having an arbiter 355. The line cards 340 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces, each of which is associated with one queue 335 in the queue memory 330. The processing engine 400 generally functions as a switching processor that modifies packets and/or headers as the BQU 310 implements queuing operations.

A routing processor 360 executes conventional routing protocols for communication directly with the processing engine 400. The routing protocols generally comprise topological information exchanges between intermediate nodes to determine preferred paths through the network based on, e.g., destination IP addresses. These protocols provide information used by the processor 360 to create and maintain routing tables. The tables are loaded into the external partitioned memories 380 as forwarding information base (FIB) tables used by the processing engine to perform forwarding operations. When processing a header in accordance with IP switching, the engine 400 determines where to send the packet by indexing into the FIB using an IP address of the header. Execution of the forwarding operations results in destination media access control (MAC) addresses of the headers being rewritten by the processing engine to identify output ports for the packets.

Figure 4:
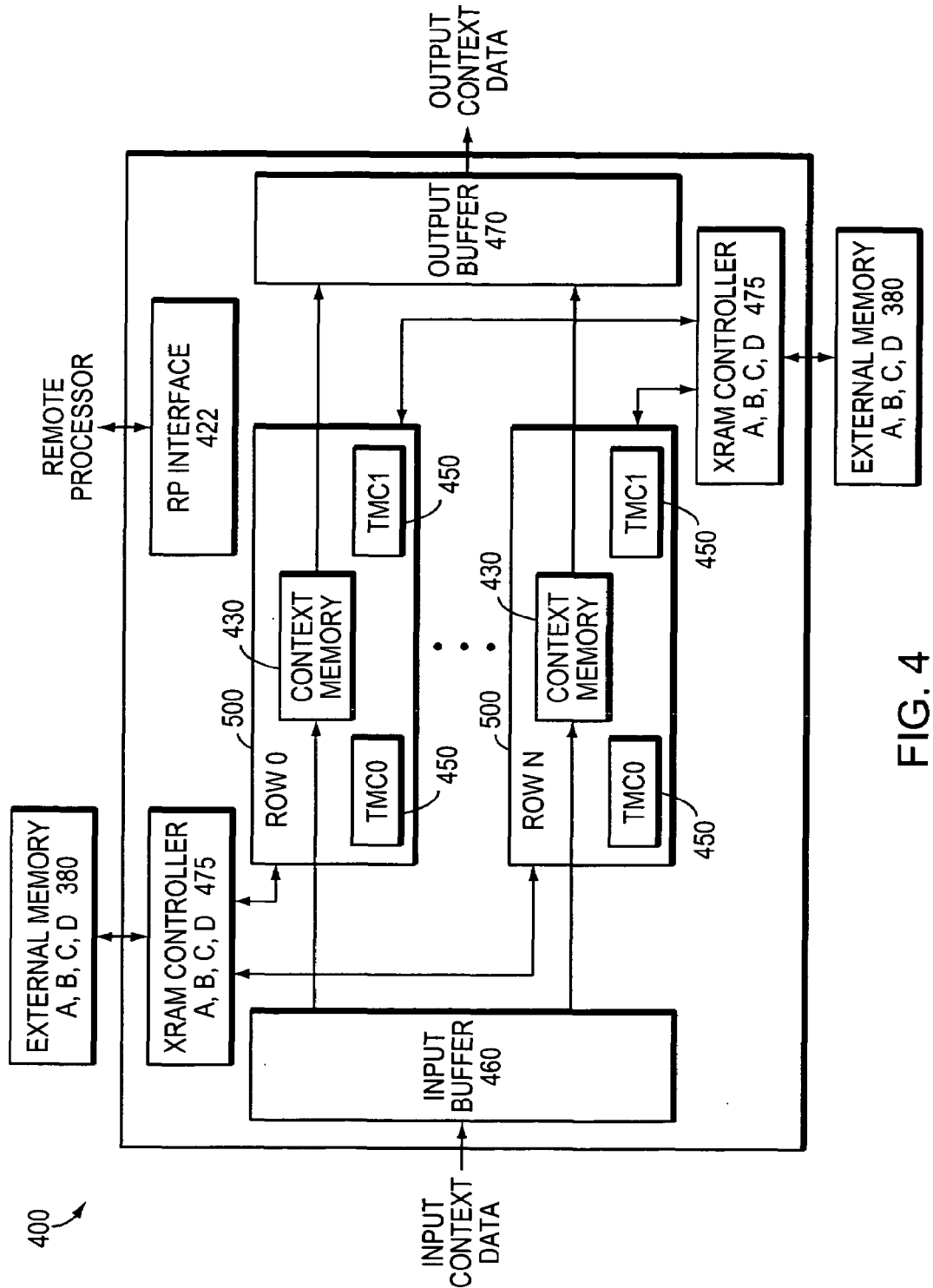
FIG. 4 is a schematic block diagram of the arrayed processing engine comprising a symmetric multiprocessor system configured as a multi-dimensioned systolic array that may advantageously implement the present invention.

FIG. 4 is a schematic block diagram of the programmable processing engine 400 which comprises an array of processors embedded between input and output header buffers with a plurality of interfaces from the array to partitions of an external memory. The external memory stores non-transient data organized within data structures for use in processing the transient data. The non-transient data typically includes "table" data contained in forwarding and routing tables, statistics access filters, encryption keys and/or queuing information. Transient data (e.g., packet/frame data) enters and exits the engine via 64-bit input and output data interfaces of the BQU 310. A remote processor interface 422 provides information, such as instructions and data, from a remote processor (not shown) to the processors and buffers over a maintenance bus having multiplexed address/data lines.

The processing engine 400 may comprise a symmetric multiprocessor system having a plurality of processors 450; moreover, the processors may be arrayed into multiple rows and columns, and further configured as a multi-dimensioned systolic array. In the illustrative embodiment, the processors are arrayed as eight (8) rows and two (2) columns in an 8×2 arrayed configuration that is embedded between an input buffer 460 and an output buffer 470. However, it should be noted that other arrangements, such as 4×4 or 8×1 arrayed configurations, may be advantageously used with the present invention. As noted herein, a single processor supporting multiple threads of execution can take advantage of the invention. The processors of each row are connected to a context memory 430 and are organized as a cluster 500.

Specifically, the processors of each row are configured as a "pipeline" to sequentially execute operations on the transient data loaded by the input buffer 460, whereas the processors of each column operate in parallel to perform substantially the same operation on the transient data, but with a shifted phase. Each phase comprises a predetermined period of cycles, e.g., 128 cycles. Sequencing circuitry of the input buffer 460 controls the processors of each pipeline by ensuring that each processor completes processing of current transient data prior to loading new transient data into the pipeline at a new phase. In general, a new phase of processing is started, i.e., a context switch is performed, when all of the processors finish processing their current context and new, incoming context is completely received by the input buffer.

The clusters 500 are coupled to external RAM (XRAM) controllers 475 that enable the processors to perform various memory operations including retrieving and storing information to address locations of the external memories 380. The controllers 475 are illustratively organized such that each external memory 380 has a separate XRAM controller.

Figure 5:
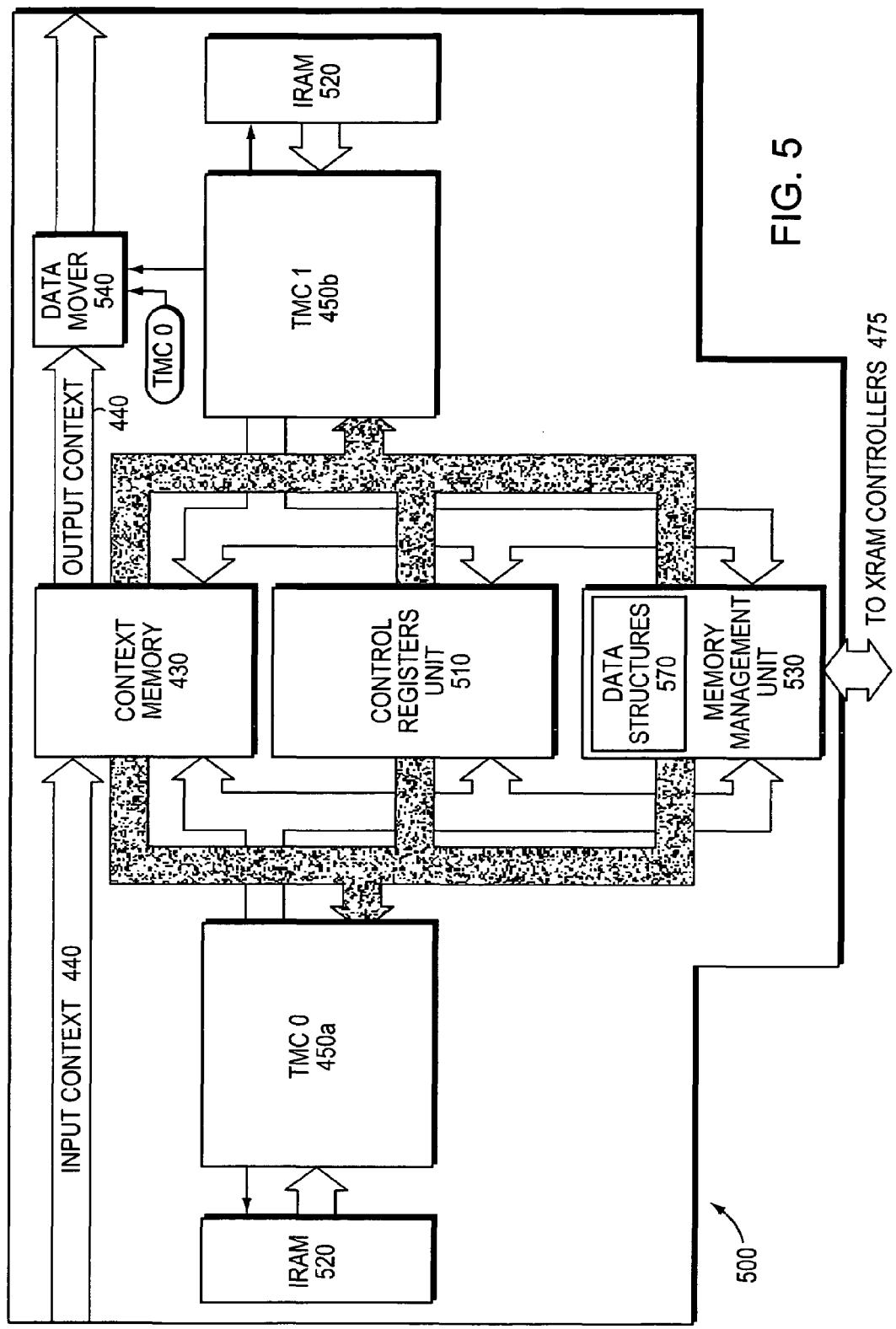
FIG. 5 is a schematic block diagram of a processor cluster of the arrayed processing engine that may be advantageously used with the present invention.

FIG. 5 is a schematic block diagram of a cluster 500. Each processor (TMC) 450 of the cluster is coupled to an instruction memory (RAM) 520 configured to store instructions for execution by the processor. Each processor is further connected to a control registers unit 510, the context memory 430 and a memory management unit (MMU) circuit 530, the latter configured to provide, inter alia, access by the cluster 500 to the external memories 380 through the XRAM controllers 475. The MMU 530 contains data structures 570 and logic used to, inter alia, generate and track memory requests issued to the XRAM controllers 475 and release locks in accordance with the inventive technique. The logic contained in the MMU 530 may include a processor coupled to a memory that contains computer readable instructions executed by the processor, including instructions for implementing aspects of the inventive technique.

Processor 450 is preferably a pipelined processor that includes, inter alia, a plurality of arithmetic logic units (ALUs) and a register file having a plurality of general purpose registers that store intermediate result information processed by the ALUs. As noted, the processors 450 of each cluster 500 execute operations on transient data loaded into the context memory 430 by the input buffer 460, whereas the processors of each column operate in parallel to perform substantially the same operation on the transient data, but with a shifted phase. Transient "context" data (e.g., packet/frame data) are passed between the input and output buffers of the engine 400 over a data path channel 440 provided by a data mover circuit 540 coupled to the processor. The context data flowing through the cluster 500 is stored in the context memory 430 along with pointers that reference data structures and tables stored in, e.g., external memory 380, for use by the processor 450.

Each external memory 380 generally comprises a plurality of (e.g., 8) banks or resources. Each external memory 380 is coupled to an XRAM controller 475, which in the illustrative embodiment, is preferably embodied as a 200 MHz external memory interface coupled to the column of processors. The XRAM controllers 475 are configured to enable shared columned processor access to the non-transient data stored in the external memory 380. The external memory 380 accessed by the processors may further comprise entries of data structures, such as tables, that are constantly updated and accessed by the processors of each column.

Figure 6:
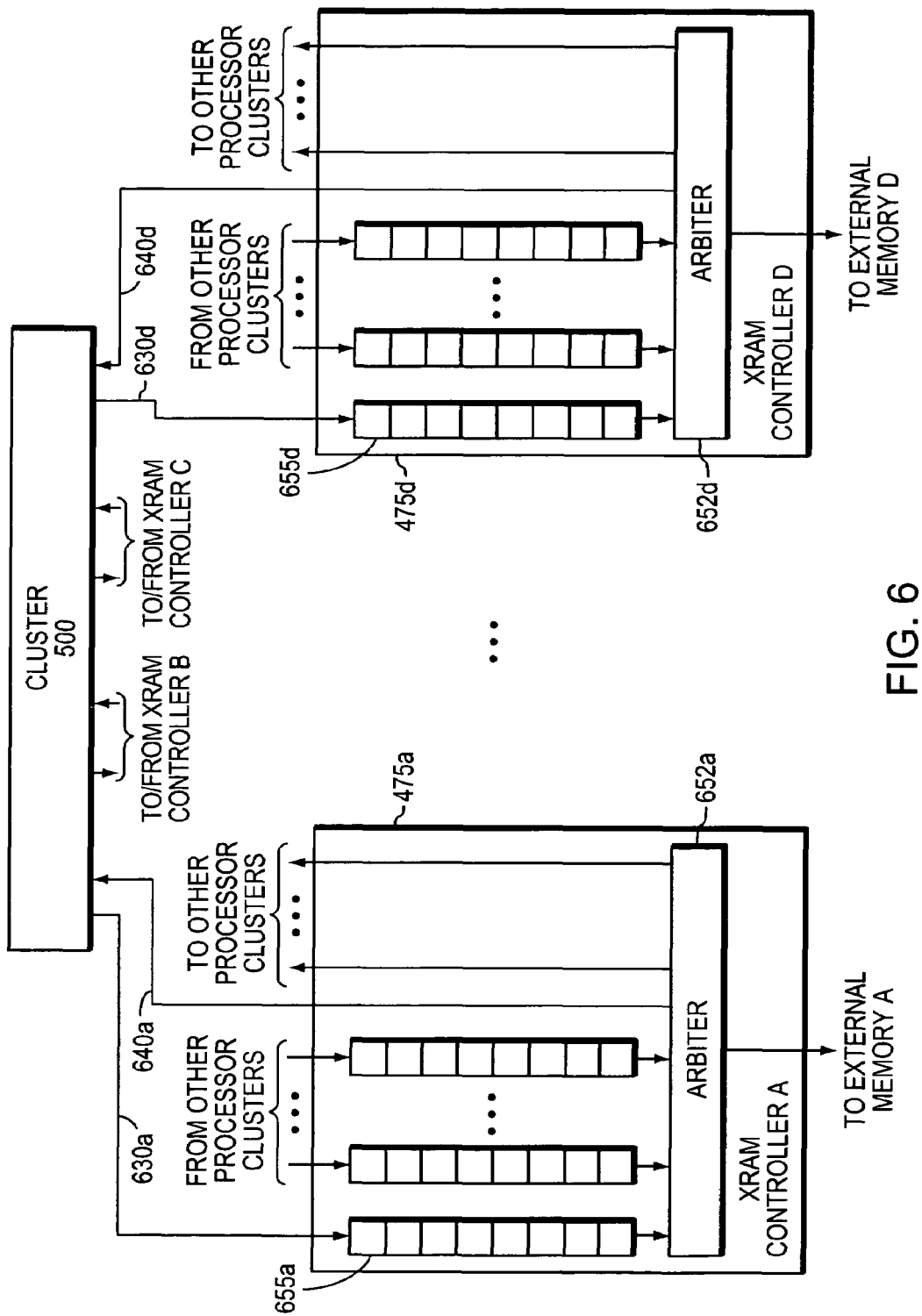
FIG. 6 is a schematic block diagram of a processor cluster coupled to a plurality of memory controllers that may be advantageously used with the present invention.

FIG. 6 is a block diagram of a cluster 500 coupled to the XRAM controllers 475. In the illustrated embodiment, there are four XRAM controllers, i.e., XRAM controller A, B, C, and D, one for each external memory 380. An XRAM controller 475 comprises an arbiter 652 and a plurality of request queues 655. The request queues 655 hold memory requests issued by the processors of clusters 500. The memory requests contain memory operations that enable the processor to, inter alia, read and write locations in the external memories 380. Each queue 655 is coupled to a specific cluster 500 and receives memory requests from the cluster via a memory-request bus 630. The received requests are then loaded into the queue at the queue's "bottom" (tail). Preferably, each queue is capable of holding up to eight memory requests. The arbiter 652 processes memory requests contained in the request queues 655 by selecting a particular request queue 655 in accordance with a predefined algorithm and processing the memory request at the "top" (head) of the selected queue. Memory request processing includes performing the memory operation contained in the request and returning a request identifier (ID) associated with the request to the cluster 500 over a bus 640 when the memory operation associated with the request completes. In the illustrated embodiment, a memory operation completes when the operation is issued by the XRAM controller 475 to the external memory 380, although, in other embodiments a memory operation is considered completed in other ways, such as when the external memory completes the memory operation.

The present invention relates to an improved technique for efficiently releasing one or more locks that are associated with one or more memory locations. The inventive technique establishes conditions where each condition is associated with a memory operation that specifies one of the memory locations. As each memory operation completes, the condition associated with operation is cleared. When all the conditions are cleared, the locks are released.

Assume that processor (TMCO) 450a is configured to perform an algorithm that acquires a lock "X" and then performs various memory operations on memory locations contained in external memories A and D, prior to releasing the lock. Further assume that the algorithm requires that the memory operations complete before the lock "X" is released. FIG. 7 is an instruction sequence 700 that may be implemented by TMCO 450a to perform this algorithm in accordance with the inventive technique. Specifically, the instruction at line 704 directs TMCO 450a to acquire lock "X." Next, the instruction at line 706 directs TMCO 450a to read memory location "A" contained in external memory "A" 380a. Since this instruction requires further processing by the MMU 530, i.e., the instruction involves a memory operation, TMCO 450a passes instruction 706 to the MMU 530 where it is further processed.

Figure 8:
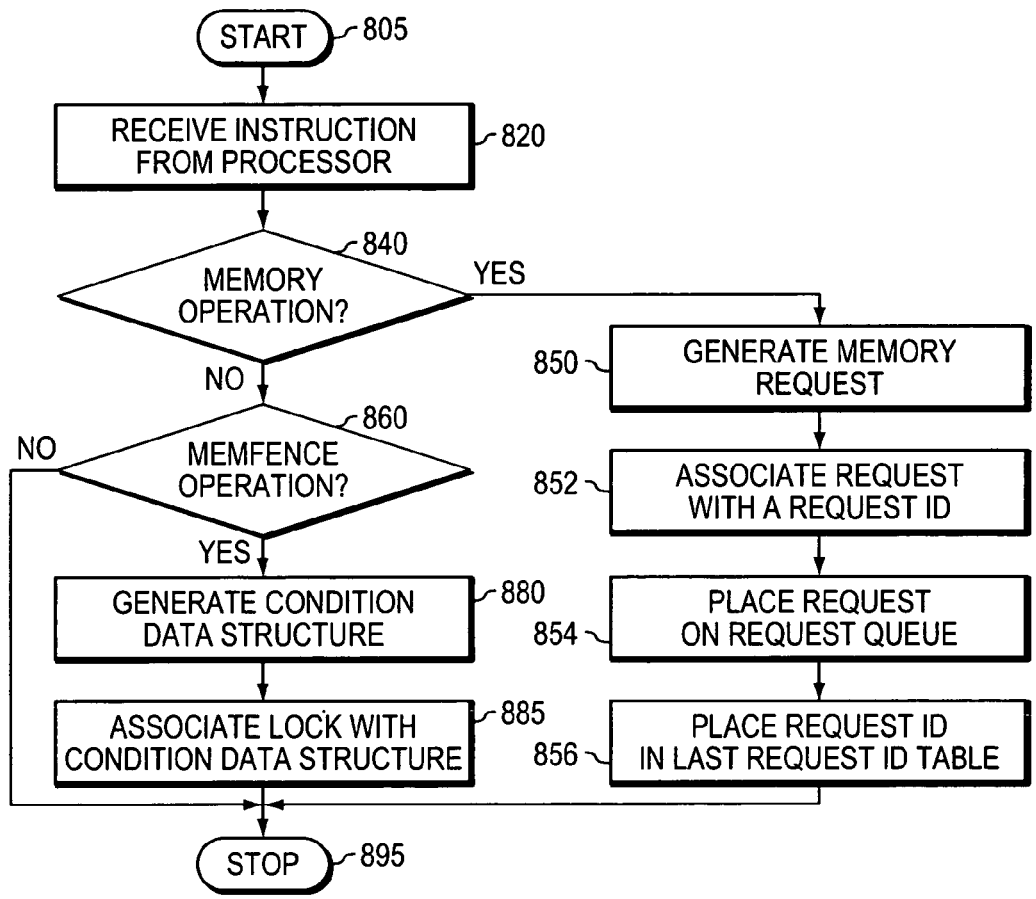
FIG. 8 is a flow diagram of a sequence of steps that can advantageously be used to process processor instructions in accordance with the inventive technique.

FIG. 8 is a flow diagram of a sequence of steps that may be implemented by MMU 530 to process instructions received by a processor 450 in accordance with the inventive technique. The sequence begins at Step 805 and proceeds to Step 820 where the MMU 530 receives the instruction from TMCO 450a. Next, at Step 840, MMU 530 determines if the instruction is a memory operation, i.e., an operation that involves sending a memory request to the XRAM controller 475. As indicated above, the instruction involves a memory operation so MMU 530 proceeds to Step 850 where it generates a memory request containing information based on the memory address and operation specified by instruction 706.

Figure 10:
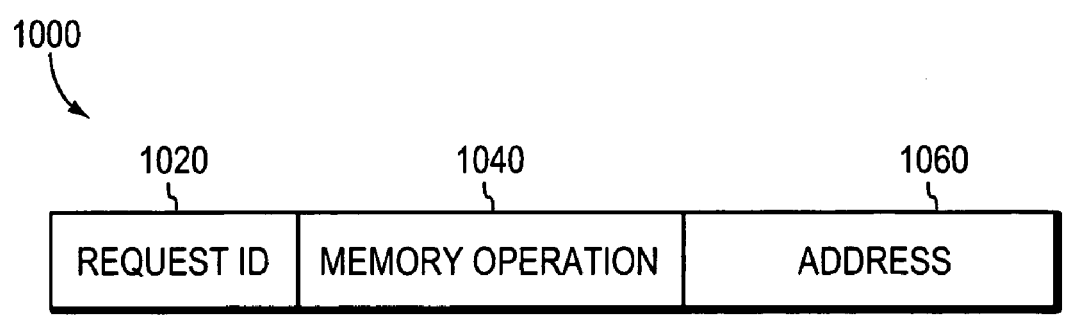
FIG. 10 is a schematic block diagram that illustrates a memory request that can be advantageously used with the present invention.

FIG. 10 is a block diagram of a memory request 1000 that can be advantageously used with the present invention. Memory request 1000 comprises a memory operation field 1040 which holds a value that represents the memory operation to be performed, e.g., a read or write operation, and an address field 1060 that holds the memory address associated with the memory operation. The request 1000 also includes a request ID field 1020 that holds a request ID that is associated with request 1000. Preferably, field 1020 is a three-bit field capable of holding request IDs for up to eight outstanding requests.

Referring to FIG. 8, at Step 852, MMU 530 associates a request ID with the generated memory request by (i) generating a request ID and (ii) assigning it to the memory request by placing the generated request ID in the request ID field 1020 of the memory request. Note that the request ID illustratively represents an integer in the range of zero to seven that is assigned in a sequential circular fashion, i.e., starts at zero, increments to seven, then repeats. Assume that the request ID value initially generated is zero.

The MMU 530 places the generated request on the request queue 655 associated with the memory location specified by the instruction, as indicated at Step 854. Since the instruction indicates the memory location is in external memory A 380a, the MMU 530 illustratively places the memory request on request queue 655a. At Step 856, the MMU 530 then places the request ID value in a last-request-identifier (last-request-ID) data structure contained in the data structures 570. The sequence then ends (stops) at Step 895.

Figure 11:
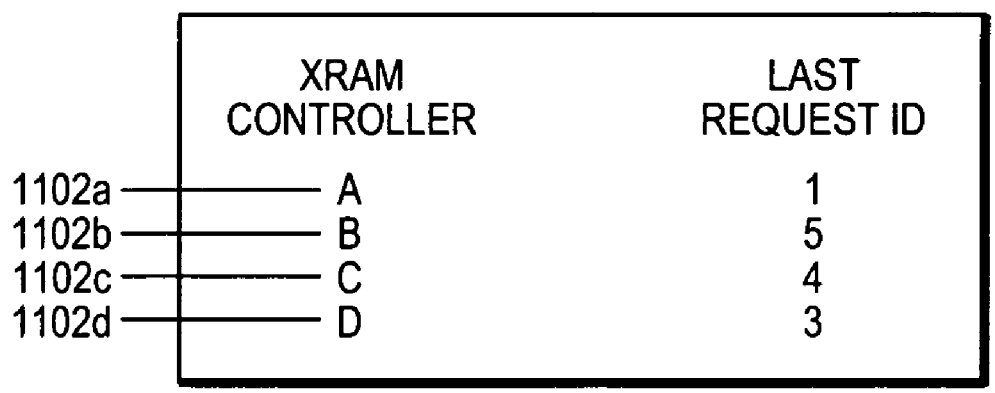
FIG. 11 is a schematic block diagram of a last-request-identifier (last-request-ID) data structure that can advantageously be used to implement the present invention.

FIG. 11 is a schematic block diagram of the last-request-ID data structure 1100 illustratively organized as a table. Table 1100 illustratively contains an entry 1102 for each XRAM controller 475. Each entry 1102 contains the request ID associated with the last memory request issued to the particular XRAM controller 475. Thus for example, in the case of a memory request associated with instruction 706 and directed to location A of XRAM controller A, the request ID for the entry 1102a is initially set to zero.

Referring also to FIG. 7, processor 450a then executes instruction 708 in a manner as described above including assigning a request ID value of one to the memory request associated with instruction 708 and directed to location A of XRAM controller A, thereby setting entry 1102a to one. Likewise, instructions 710 and 712 are executed by the processor as described above resulting in entry 1102d being set to three.

Processor 450 then executes instruction 714, which is a MEMFENCE instruction that operates in accordance with the present invention. The MEMFENCE instruction 714 is not a memory operation in that it does not generate a memory request. Rather, the instruction is a MEMFENCE operation that causes the MMU to monitor the memory subsystem, i.e., the XRAM controllers, for certain specified memory operations to complete, and, when the operations complete, release the specified locks. The illustrative syntax of the MEMFENCE instruction is:

MEMFENCE locks, memory_controllers wherein the locks parameter specifies one or more locks to be released and the memory_ controllers parameter specifies the memory controllers whose memory operations must complete before the specified locks are released. For example, the MEMFENCE instruction at line 714 directs MMU 530 to release lock X when the memory operations associated with memory locations A and D contained in external memories A and D, and associated with XRAM controllers A and D, complete.

Referring once again to FIG. 8, at Step 840 since the MEMFENCE instruction is not a memory operation, the MMU 530 proceeds to Step 860 where it determines whether or not the instruction is a MEMFENCE operation. If not, the sequence ends at 895. Since as indicated above the MEMFENCE instruction is a MEMFENCE operation, the MMU 530 establishes the conditions that must be met before the locks set forth in the MEMFENCE instruction can be released. In particular, the conditions are illustratively established by generating a condition data structure in data structures 570.

Figure 12:
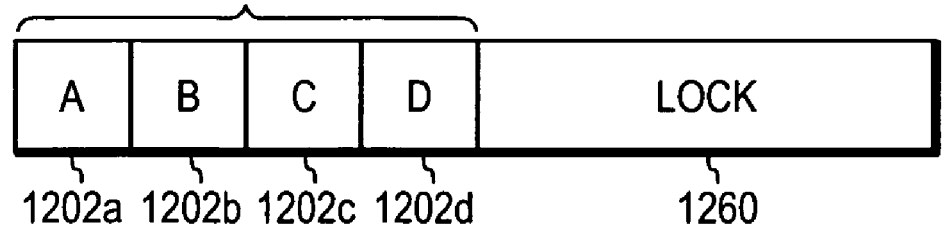
FIG. 12 is a schematic block diagram of a condition data structure that can advantageously be used to implement the present invention.

FIG. 12 is a block diagram of a condition data structure 1200 that can be advantageously used with the present invention. Data structure 1200 comprises a lock field 1260 that designates locks to be released and a condition field 1240 that designates conditions that must be met before the locks are released. The condition field 1240 comprises a plurality of condition subfields 1202, one for each XRAM controller 475, where each subfield designates a condition that must be met for the particular controller. The designated condition is illustratively an expected request ID that must be received by the MMU 530 from the particular XRAM controller in order for the condition to be met. That is, the condition is considered met when the request ID specified in the subfield is received from the respective XRAM controller. The subfields are illustratively ordered such that subfield 1202a is associated with XRAM controller A 475a, subfield 1202b is associated with controller B 475b and so on. The lock field 1260 designates the locks that are to be released when all the conditions are met.

Figure 9:
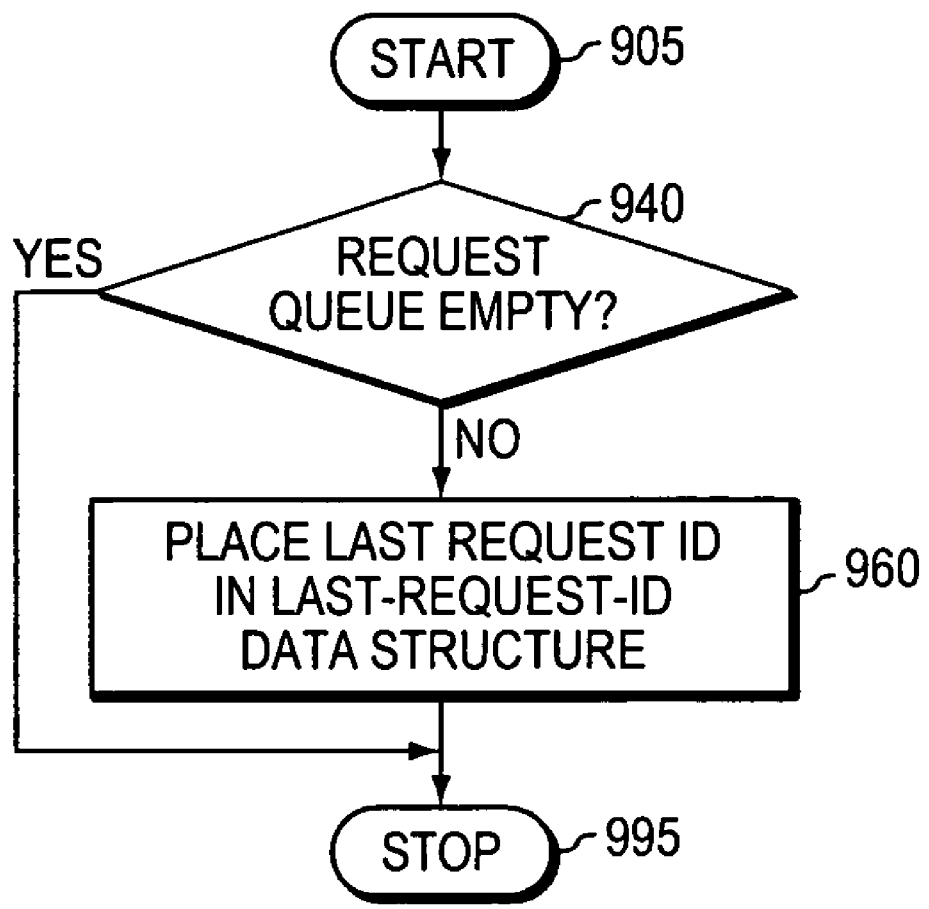
FIG. 9 is a flow diagram of a sequence of steps that can advantageously be used to generate a condition in accordance with the inventive technique.

Referring again to FIG. 8, as noted at Step 880, the MMU 530 generates the condition data structure that contains conditions associated with each memory location specified in the MEMFENCE instruction. FIG. 9 illustrates a sequence of steps that can be used to create a condition associated with a memory location in accordance with the inventive technique. The sequence begins at Step 905 and proceeds to Step 940 where the MMU 530 determines if the request queue associated with the memory location is empty. If so, the sequence proceeds to Step 995 where it ends. Otherwise, the sequence proceeds to Step 960 where the condition associated with the memory location is generated by placing the last request ID associated with the XRAM controller in the respective subfield 1202 of the condition data structure 1200. Steps 940 through 960 are repeated for each memory location specified in the MEMFENCE instruction. Thus for example, for the MEMFENCE instruction at line 714, the MMU 530 places the last request ID for XRAM controller A, i.e., "1" contained in entry 1102a, and XRAM controller D, i.e., "3" contained in entry 1102d, into subfields 1202a and 1202d, respectively.

Referring again to FIG. 8, at Step 885, the MMU associates the locks specified in the MEMFENCE command, e.g., lock X, with condition data structure 1200 by placing a value that represents the locks in the lock field 1260. The sequence then ends (stops) at Step 895.

As indicated above as each memory operation associated with an XRAM controller completes, the XRAM controller returns the request ID, i.e., a return-request identifier (return-request ID), associated with the memory operation back to the MMU 530. The MMU 530, in turn, processes the return-request ID including applying it to a condition data structure 1200 to determine if a particular condition is met.

Figure 13:
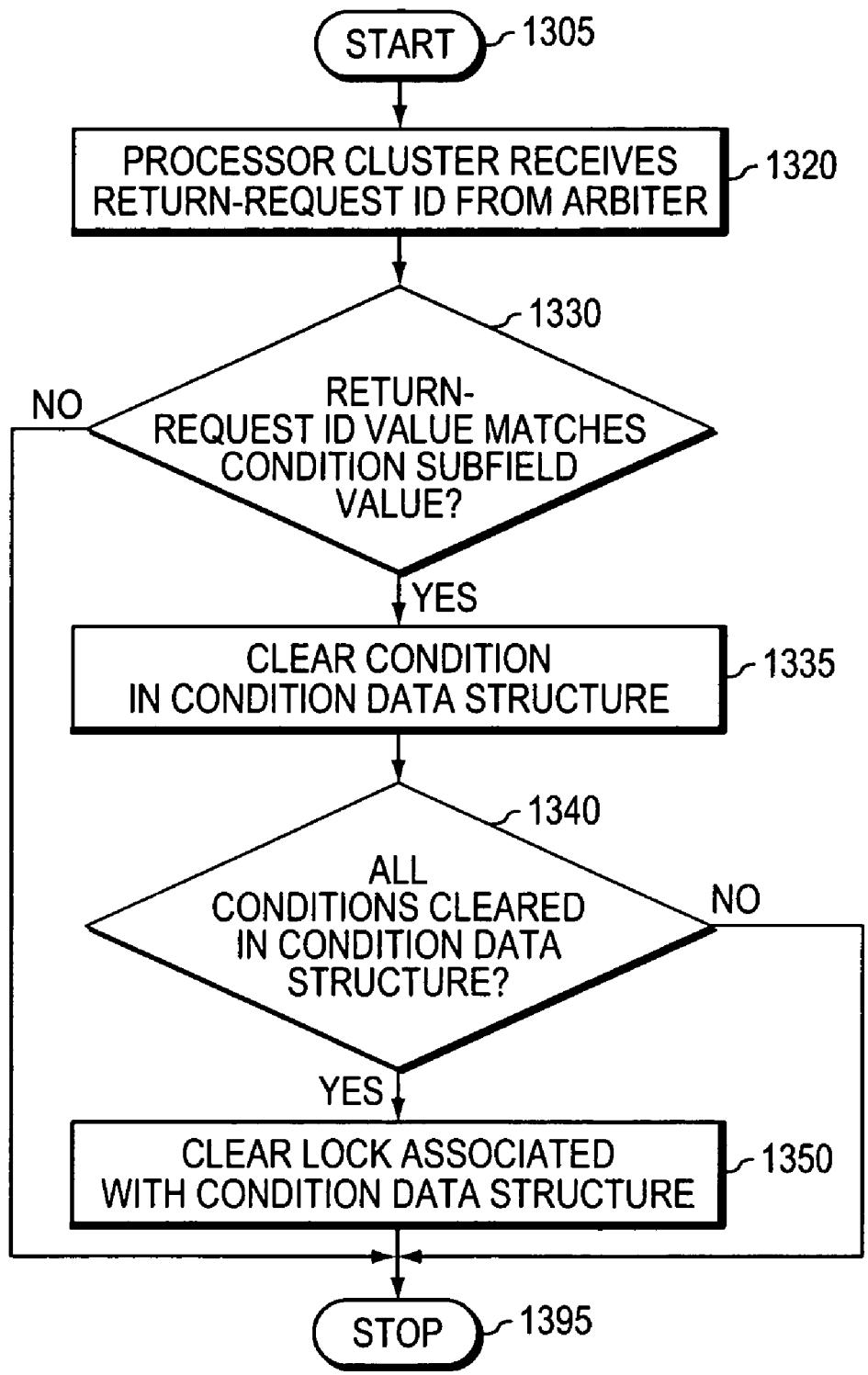
FIG. 13 is a flow diagram of a sequence of steps that can advantageously be used to process a returned-request identifier (ID) in accordance with the inventive technique.

FIG. 13 is a flow diagram of a sequence of steps that may be implemented by MMU 530 to process a request ID received from an XRAM controller. The sequence begins at Step 1305 and proceeds to Step 1320 where the MMU 530 receives the return-request ID from the arbiter 625 indicating the memory request has completed. Illustratively, the return-request identifier (ID) contains the value of the request ID associated with the completed memory request. At Step 1330, the MMU 530 determines if the value contained in the condition subfield 1202 associated with the XRAM controller matches the returned-request ID value. If they do not match, the sequence proceeds to Step 1395 where the sequence ends.

Otherwise, the sequence proceeds to Step 1335 where the MMU 530 clears the value contained in the condition subfield 1202. For example, when the memory request associated with the instruction at line 708 completes, XRAM controller A 475a sends a return-request ID having a value of "1," i.e., the request ID associated with the memory request, back to MMU 530. The MMU 530, in turn, compares the return-request ID with the request ID in subfield 1202a of the condition data structure 1200 and if they match, clears the subfield 1202a. Likewise, for the memory request associated with line 712, when the request completes XRAM controller D 475d sends the request ID having a value of "3" back to the MMU 530 and the MMU 530 clears the request ID in subfield 1202d.

Next at Steps 1340 and 1350, MMU 530 determines if all the conditions for condition data structure 1200 have been met and if so, clears the locks associated with the condition data structure 1200. Specifically, MMU 530 examines each condition field 1240 and if all the subfields 1202 are cleared, the MMU 530 concludes all the conditions have been met and clears the locks specified in the lock field 1240. The sequence then ends (stops) at Step 1395.

In the above-described embodiment of the invention, instruction execution continues after the MEMFENCE instruction is processed. In another embodiment of the invention, the MEMFENCE operation is modified to include a synchronize parameter that specifies whether or not the MEMFENCE operation should stall instruction execution until all the specified conditions are met. In this embodiment, if the synchronize parameter is specified, the processor waits for the locks specified in the MEMFENCE operation to be cleared before continuing instruction execution with the next instruction following said MEMFENCE instruction.

It should be noted that the above-described embodiment of the invention is described as implemented in an intermediate node. However, this is not intended to be a limitation of the invention. The inventive technique can be implemented in other embodiments involving multiple processors accessing one or more shared memory subsystems. For example, in one embodiment of the invention the inventive technique is implemented in a computer system comprising multiple processors and a shared memory. The processors issue memory requests to the shared memory and the shared memory is configured to return signals, such as a return-request identifier (ID) as described above or a status bit, indicating that the various memory requests have completed.

It should also be noted that in the illustrated embodiment of the invention a condition is generated by using a request ID associated with a last memory request sent to an XRAM controller (interface). However, this too is not intended to be a limitation of the invention. In other embodiments of the invention the conditions are generated using other means. For example in one embodiment of the invention, a signal, such as a status bit, is returned to the MMU when a memory operation completes. The processor generates the condition data structure based on this status-bit notation. In this embodiment, the conditions in the condition data structure are represented as a bit vector where each bit denotes a condition associated with a specific memory operation that must complete before the condition is met. When a memory operation completes, a signal, such as described above, is returned indicating the memory operation has completed. The signal is then used to locate an associated condition represented in the bit vector, which is then cleared. When all the conditions in the bit vector are cleared, the locks associated with the condition data structure are cleared.

Although the above-described embodiment utilizes a single condition data structure, this too is not intended to be a limitation of the invention. Rather, in other embodiments of the invention, more than one condition data structure is used. Advantageously, performance may improve by utilizing more than one condition data structure. For example, in one embodiment of the invention, two condition data structures are used, thereby enabling two MEMFENCE instructions to be outstanding at any given time. Performance may improve over a single condition data structure, as a second MEMFENCE instruction need not wait for the condition data structure utilized by a first MEMFENCE instruction to be available before it can proceed. Rather the second MEMFENCE instruction can utilize the data structure that is not in use.

In summary, the present invention relates to a technique for releasing locks associated with particular memory locations. The inventive technique employs a "background" approach to releasing the locks in that the memory subsystem monitors the memory operations associated with the locks in the background while instructions continue to execute on the processor. When the memory subsystem indicates that all the memory operations have completed the lock is released. The inventive technique is an improvement over existing techniques in that it does not require serialization of instructions nor polling of memory operations in order to ensure that a lock is not released before the operations associated with the lock have completed, thereby enabling instruction execution to continue without having to stall while waiting for the memory operations to complete.

It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for releasing one or more locks associated with one or more memory locations in a computer system, the method comprising the steps of:
    establishing one or more conditions wherein each condition is associated with a memory request containing one of the memory locations;
    assigning a request identifier (ID) to each memory request;
    issuing each memory request to a memory controller associated with the memory location contained in the memory request;
    receiving a return-request identifier (ID) from the memory controller;
    comparing the return-request identifier to the request identifier;
    clearing the condition if the return-request identifier matches the request identifier assigned to the memory request associated with the condition, thereby indicating that the associated memory request is complete; and
    releasing the one or more locks when all the conditions have been cleared.

2. A method as defined in claim 1 wherein the step of establishing further comprises the step of:
    establishing each condition by placing the request identifier associated with the last memory request issued to the memory controller in a condition data structure.

3. A method as defined in claim 2 wherein the condition data structure contains a plurality of subfields and where each subfield is associated with a particular memory controller, the method further comprising the step of:
    placing the request identifier in the subfield associated with the memory controller.

4. A system adapted to release one or more locks associated with one or more memory locations of an intermediate network node, the system comprising:
    a memory management unit (MMU) configured to generate memory requests, each memory request containing one of the memory locations, the MMU configured to generate one or more conditions wherein each condition is associated with a memory request and issue each memory request to a memory controller associated with the memory location contained in the memory request, the MMU further configured to assign a request identifier (ID) to each memory request, the MMU further configured to clear each condition when its associated memory request completes and release the one or more locks associated when all the conditions are cleared;
    one or more memory controllers coupled to the MMU wherein each memory controller is configured to return a return-request identifier (ID) to the MMU when the issued memory request completes; and
    wherein the memory management unit (MMU) is further configured to compare the return-request identifier to the request identifier, and clear the condition associated with the memory request if the return-request identifier matches the request identifier assigned to the memory request associated with the condition.

5. A system as defined in claim 4 further comprising one or more processors coupled to the MMU and the MMU is further configured to receive one or more instructions from the processors.

6. A system as defined in claim 5 wherein one of the instructions specifies the locks and the memory locations.

7. A system as defined in claim 4 further comprising a condition data structure and wherein the memory management unit (MMU) is further configured to establish each condition by placing the request identifier associated with the last memory request issued to the memory controller in the condition data structure.

8. A system as defined in claim 4 further comprising a last request identifier (ID) data structure wherein the data structure contains the request identifier of the last request issued to each of the memory controllers.

9. An apparatus for releasing one or more locks associated with one or more memory locations comprising:
    means for establishing one or more conditions wherein each condition is associated with a memory request containing one of the memory locations;
    means for assigning a request identifier (ID) to each memory request;
    means for issuing each memory request to a memory controller associated with the memory location contained in the memory request;

means for receiving a return-request identifier (ID) from the memory controller;
means for comparing the return-request identifier to the request identifier;
means for clearing the condition if the return-request identifier matches the request identifier assigned to the memory request associated with the condition, thereby indicating that the associated memory request is complete; and
means for releasing the one or more locks when all the conditions have been cleared.

10. An apparatus as defined in claim 9 further comprising:
means for establishing each condition by placing the request identifier associated with the last memory request issued to the memory controller in a condition data structure.

11. An apparatus as defined in claim 9 further comprising means for generating a signal when the memory request completes.

12. An apparatus as defined in claim 11 wherein the signal is the return-request identifier (ID).

13. An apparatus as defined in claim 11 wherein the signal is a status bit.

14. A computer readable media comprising computer executable instructions for execution on a processor for:
establishing one or more conditions wherein each condition is associated with a memory request containing one of the memory locations;
assigning a request identifier (ID) to each memory request;
issuing each memory request to a memory controller associated with the memory location contained in the memory request;
receiving a return-request identifier (ID) that indicates the memory request is complete;
comparing the return-request identifier to the request identifier;
clearing each condition if the return-request identifier matches the request identifier; thereby
releasing the one or more locks when all the conditions have been cleared.

15. The computer readable media as defined in claim 14 further comprising computer executable instructions for execution in a processor for:
issuing each memory request to a memory controller associated with the memory location contained in the memory request.

16. The computer readable media as defined in claim 15 further comprising computer executable instructions for execution in a processor for:
establishing each condition by placing the request identifier associated with the last memory request issued to the memory controller in a condition data structure.

17. A method for operating a memory comprising the steps of:
generating a memory request;
assigning a request identifier to the memory request;
locking a portion of memory for the request;
receiving a return request identifier from a memory controller;
comparing the return-request identifier with the request identifier from the memory controller;
clearing the lock if the return-request identifier matches the request identifier.

18. A memory system comprising:
means for generating a memory request;
means for assigning a request identifier to the memory request;
means for locking a portion of memory for the request;
means for receiving a return request identifier from a memory controller;
means for comparing the return-request identifier with the request identifier from the memory controller;
means for clearing the lock if the return-request identifier matches the request identifier.

19. A method for releasing one or more locks associated with one or more memory locations in a computer system, the method comprising the steps of:
establishing one or more conditions by a memory management unit (MMU) wherein each condition is associated with a memory request containing one of the memory locations;
receiving a return-request identifier (ID) from a memory controller;
comparing the return-request identifier to a request identifier
clearing one of the one or more conditions if the return-request identifier matches the request identifier assigned to the memory request associated with the condition; and
releasing the one or more locks by the MMU when all the conditions have been cleared.

20. The method of claim 19, further comprising:
assigning the request identifier (ID) to each memory request.

21. The method of claim 19, further comprising:
issuing each memory request to a memory controller associated with the memory location contained in the memory request.

22. The method of claim 19, further comprising:
establishing each condition by placing a request identifier associated with a last memory request issued to a memory controller in a condition data structure.

23. An apparatus for releasing one or more locks associated with one or more memory locations in a computer system, comprising:
means for establishing one or more conditions by a memory management unit (MMU) wherein each condition is associated with a memory request containing one of the memory locations;
means for receiving a return-request identifier (ID) from a memory controller;
means for comparing the return-request identifier to a request identifier;
means for clearing the condition if the return-request identifier matches the request identifier assigned to the memory request associated with the condition; and
means for releasing the one or more locks by the MMU when all the conditions have been cleared.

24. The apparatus of claim 23, further comprising:
means for assigning the request identifier (ID) to each memory request.

25. The apparatus of claim 23, further comprising:
means for issuing each memory request to a memory controller associated with the memory location contained in the memory request.

26. The apparatus of claim 23, further comprising:
means for establishing each condition by placing a request identifier associated with a last memory request issued to a memory controller in a condition data structure.

27. A system configured to release one or more locks associated with one or more memory locations in a computer system, comprising:
- a memory management unit (MMU) configured to establish one or more conditions wherein each condition is associated with a memory request containing one of the memory locations;
- the MMU further configured to receive a return-request identifier (ID) from a memory controller;
- the MMU is further configured to compare the return-request identifier to a request identifier, and clear the condition if the return-request identifier matches the request identifier assigned to the memory request associated with the condition;
- the MMU is further configured to release the one or more locks when all the conditions have been cleared.

28. The system of claim 27, further comprising:
- the MMU is further configured to assign the request identifier (ID) to each memory request.

29. The system of claim 27, further comprising:
- the MMU is further configured to issue each memory request to a memory controller associated with the memory location contained in the memory request.

30. The system of claim 27, further comprising:
- the MMU is further configured to establish each condition by placing a request identifier associated with a last memory request issued to a memory controller in a condition data structure.

* * * * *